Sept. 30, 1969 | AKITO YANAI | 3,470,562

VIDEOMETER

Filed April 7, 1966 | 2 Sheets-Sheet 1

INVENTOR.
Akito Yanai

BY

Attorney

Sept. 30, 1969 AKITO YANAI 3,470,562

VIDEOMETER

Filed April 7, 1966 2 Sheets-Sheet 2

INVENTOR.
Akito Yanai

BY

[signature]
Attorney

United States Patent Office 3,470,562
Patented Sept. 30, 1969

3,470,562
VIDEOMETER
Akito Yanai, Tokyo, Japan, assignor to Kabushiki Kaisha Dentsu, Tokyo, Japan, a corporation of Japan
Filed Apr. 7, 1966, Ser. No. 541,002
Claims priority, application Japan, Apr. 8, 1965, 40/20,315
Int. Cl. G01d *9/02*
U.S. Cl. 346—37 1 Claim

ABSTRACT OF THE DISCLOSURE

Control means, including a motor with an operating shaft for turning a turret tuner, operates the motor to adjust the tuner to the frequency of the signals from the oscillator of a television receiver every time the latter is tuned to a different channel. A recording tape is continuously fed at uniform speed past a station by means operated by a synchronous motor which runs while the receiver is on, and there being at this station a plurality of punches spaced transversely of the tape and a common actuator for all punches which is activated by a relay energized at equal periodic intervals on closure of a switch by a cam driven by the synchronous motor. Directly mounted on the operating shaft are a plurality of cams with which cooperate followers, of which different combinations of cams for different tuned channels displace their respective followers intermediate therewith associated punches and the common actuator, with the latter when activated forcing into the tape only those punches with intermediate followers therebetween.

The present invention relates to a videometer.

Television audience research in the prior art was quite inadequate. Each viewer in the research program was required to keep a diary showing the television programs that he watched. The information in these diaries was collected and then totalled. This required the use of the telephone and other inadequate methods to obtain the information collected by the viewers.

It is an object of the present invention to provide a videometer which monitors the television receiver and determines whether or not it is in operation. If the television receiver is in operation, the videometer will determine the channel to which it is tuned. These results will be indicated on a time basis for each television receiver so as to mechanically and automatically record the audience viewing activity for each minute of the day. The videometer will produce precise and accurately recorded tapes and will classify and sum up the total results of audiences at a central station for delivery thereof to an electronic computer for analysis.

A videometer pursuant to the present invention comprises a detector which receives the leakage current of a local oscillator in a television set and determines the channel to which the set is tuned when the frequency of the television receiver turret tuner comes into accord with the frequency of the leakage current of the local oscillator of the television receiver to thereby record the time, by minute, on a recording tape that images are received on the receiver. The tapes are punched in code for the various channels and are also punched, in the form of trouble marks, to record troubles. The videometer is usually housed in a casing which is attached to a television set in each home which has been selected for the television audience research project and will thus detect the changes in the local oscillating frequencies of the television receiver which are produced as the viewer changes channels. A simple antenna is used to detect these local oscillator frequency changes, the changes or variations are fed into the detector section of the videometer and punching blocks are used to punch the obtained results, on a minute by minute basis, on the recording tape.

Other and further objects and advantages of the present invention will be readily apparent to those skilled in the art from a consideration of the following specification taken in connection with the appended drawings.

In the drawings, which illustrate the best mode presently contemplated for carrying out the invention:

Figures 1, 4:
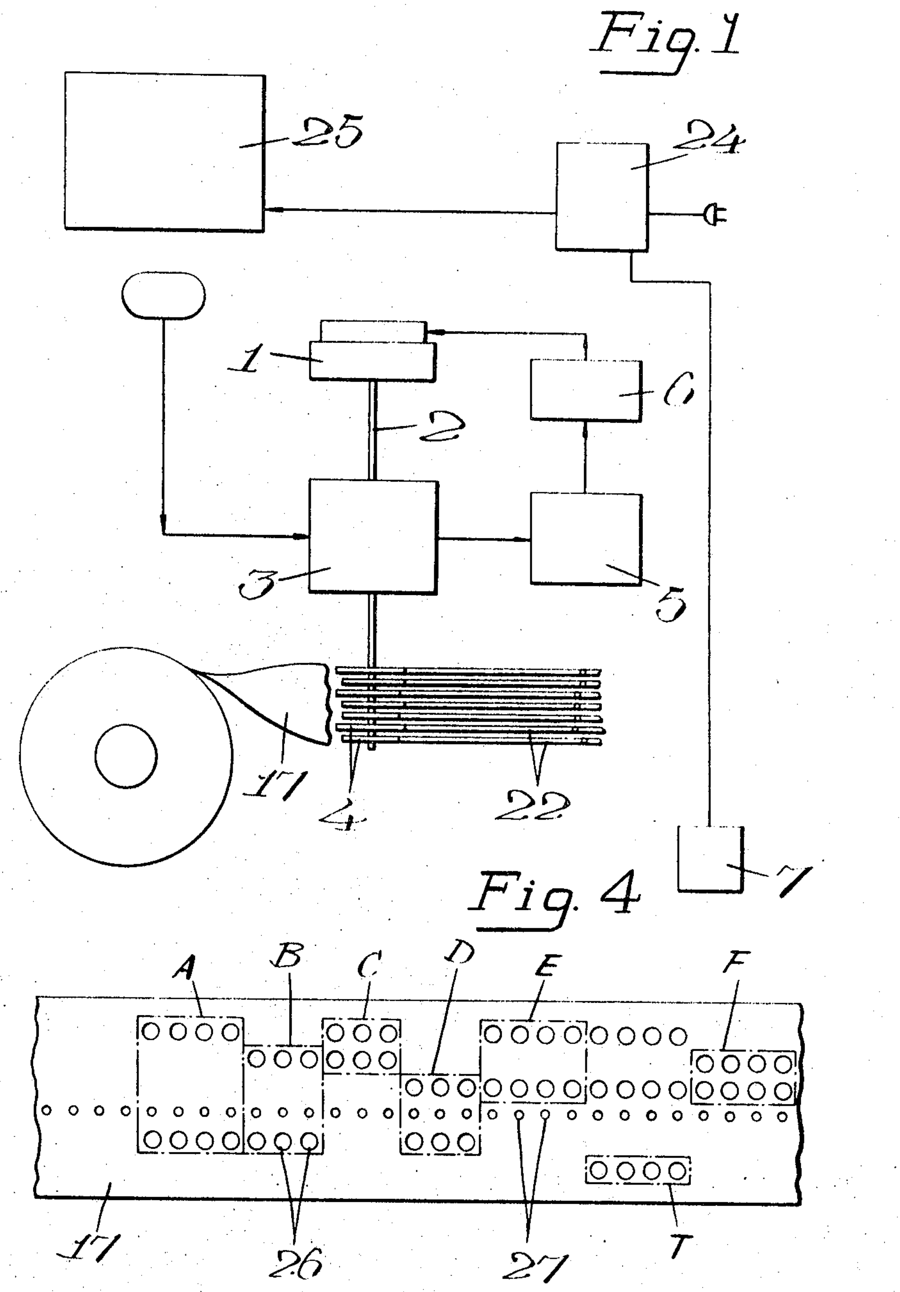
FIG. 1 is a diagrammatic view showing a television channel detection system in a videometer pursuant to the present invention.
FIG. 4 is a plan view of the recording tape for the videometer.
Figure 2:
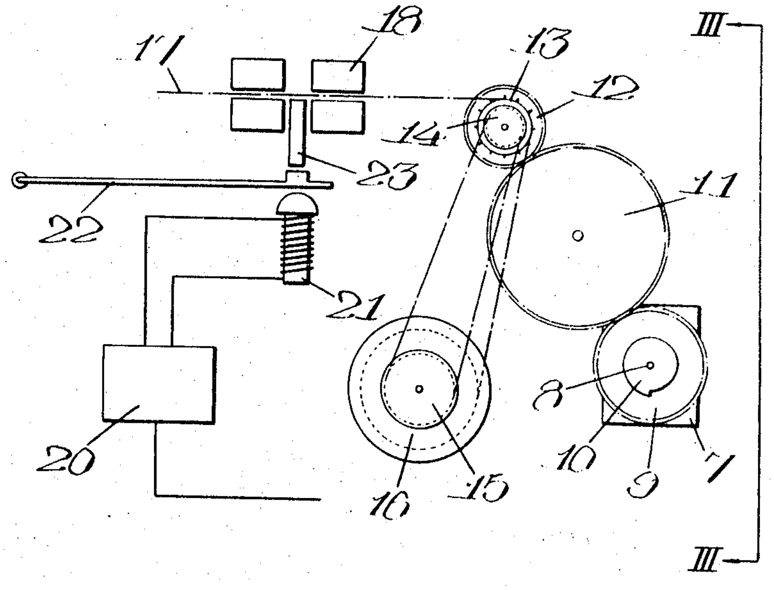
FIG. 2 is a front view of the recording system.
Figure 3:
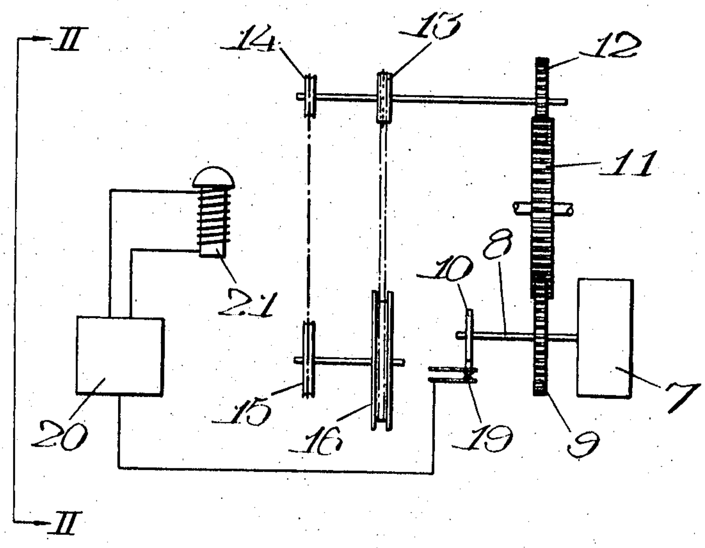
FIG. 3 is a side view of the recording system.

Referring now to FIG. 1 of the drawings in detail, the reference numeral 1 indicates a turret drive motor provided with a shaft 2. The shaft mounts a turret tuner 3 and a plurality of deformed cams 4, there being one cam for each television channel. The output of the turret tuner 3 is connected to the tuner drive motor 1 through an amplifier 5 and a relay control circuit 6 so as to control the tuner drive motor. As best shown in FIGS. 2 and 3, provision is made for a motor 7, preferably a synchronmotor provided with a shaft 8 to which there is keyed a gear 9 and a timing cam 10. Gear 9 meshes with a gear 11 which, in turn, meshes with a gear 12 for rotating both a sprocket wheel 13 and a pulley 14. Pulley 14 is belted to a pulley 15 so as to drive the latter. Pulley 15 is provided with a clutch so as to drive a winding bobbin 16. The sprocket wheel 13 moves a recording tape 17 between tape punching blocks 18. The tape is spooled around the winding bobbin 16. The timing cam 10 opens or closes a punching switch 19. When the switch is closed a punch control circuit 20 is energized to actuate a solenoid 21. The solenoid, when actuated, pushes transverse rods 22, held by the deformed cams 4, against punch pins 23 which punch the tape 17.

When electric power is transmitted from a power source 24 to a television receiver 25 and the motor 7, the latter causes timing cam 10 to make one complete rotation each minute. Cam 10 closes switch 19 at the end of each cam revolution so that the punching solenoid 21 operates instantly to push the transverse rod 22 against the punch pin 23 whereby to push the latter into the tape 17. As a result, holes are punched into the recording tape. The motor 7, operating through the gear train 9, 11 and 12, rotates the sprocket wheel 13. The sprocket wheel teeth are engaged in the central holes 27 of the tape 17 so to withdraw the latter. The tape is wound on the bobbin 16 which is rotated by means of the pulleys 14 and 15. Since the motor 7 operates both the sprocket wheel 13, which withdraws the tape, and the cam 10 which closes switch 19, holes can be punched precisely on the recording tape at equal intervals of one minute. Experiments have established that errors taking place during the operation of the device for a full week stayed within the range of 1/10,000 to 3/10,000. No theoretical errors were found with respect to the broadcast stations, and the trouble marks appeared with certainty in the case of mistuning. As a result, records resulting from mistuning can be excluded from the final results which, therefor, will be most accurate.

Since both the amplifier and punching sections of the videometer must operate with certainty while the audience views the television receiver, the motor 7 of the punching section is energized from the same power source 24 which energizes the television receiver 25. Consequently, when the television receiver is switched "ON," the videometer is also simultaneously switched "ON."

An antenna 30 is utilized to receive the frequencies of the local oscillator in the television receiver 25. By this means, signals representative of the leakage voltage of the local oscillator are applied to the input terminal of the turret tuner 3. The detected output of these leakage voltages is amplified by the amplifier 5 and taken out from the amplifier or a variation of the plate current of the final stage of the amplifier. In the high frequency section, the tuning circuit is established for every channel and the turret tuner 3. The power source for the tuner motor 1 can be connected or disconnected by the relay contact circuit 6. As a result, the tuning circuit is established and the relay can be operated instantaneously. Thereafter, the power source of the motor is disconnected and the turret tuner 3 stops at its tuning position representative of the channel to which the television receiver 25 is tuned. This fixes in position the cam 4 for the particular channel being received. When the television receiver is tuned to a different channel, a different signal is applied to the turret tuner 3 which will immediately act on the tuning drive motor 1, through the amplifier 5 and the relay control circuit 6 to coincide with the new signal frequency being received. As a result the turret drive motor operates the deformed cams 4 carried by shaft 2. The cams operate the respective transverse rods 22. The projections on those rods which are moved transversely bear against the associated punch pins 23 while the remaining rod projections which are not required for the particular channel being received are moved away from the respective punch pins. As a result, the punching operation is effected by a predetermined group of punch pins, the projections on the associated rods 22 moving into the positions occupied by the associated punch pins 23. In the present device, a television channel is indicated by a plurality of punched holes in one set of holes. A change in the receiving channel can be detected if any of the holes in the set are displaced from the row of holes in the set. This will be apparent from FIG. 4 wherein the reference letters A, B, C, D, E and F each denote a set of holes punched in tape 17 for a different television receiving channel. The reference letter T denotes a set of holes punched in the tape to indicate trouble.

The motor 7 is in continuous operation from the beginning to the end of the recording. Consequently, if the date and time of the initiation of the recording is indicated on the tape, the lapse of time may be ascertained from the feed holes 17 which extend along the tape at predetermined intervals without regard to the presence or absence of the recorded holes. If the television receiver is not in operation, holes are not punched in the tape. However, the feed holes will appear in a continuous row in the tape. The tape is provided with 1440 feed holes for each 24 hour operation, the feed holes representing one minute intervals. A length of tape is provided in accordance with the number of days that the recording device is to operate and also additional tape for supplementary operation. With the day and time of the initiation of viewing of the television received being previously recorded on the tape, the period and time of viewing of each television channel is indicated on the tape during the entire recording period thereof.

A videometer in accordance with the present invention need not be mounted in proximity to the television receiver. It may be mounted remotely from the television receiver if a wireless switch is utilized so that there need be no expense involved on the part of the viewer. The recording on the tape is effected with extreme accuracy at intervals of one minute over a relatively long period in an automatic operation. The recording tape can provide a complete record which can be converted into required information at relatively high speeds utilizing adding machines. The record may be compiled in basic data form and fed to an electronic computer for analysis. As a result, the device will provide detailed audience research with utmost speed and accuracy.

What is claimed is:

1. A videometer, comprising a turret tuner, means including a motor with a shaft directly connected with said tuner for driving said tuner to adjust the latter to the frequency of signals from the oscillator of a television receiver, means including a synchronous motor and a sprocket driven thereby having teeth in mesh with successive ones of equally spaced holes in a longitudinal recording tape for advancing the tape at uniform speed past a station, a number of punches at said station spaced transversely of the passing tape, a plurality of cams carried directly by said motor shaft and being equal to said number, rods in follower relation with said cams, respectively, and associated with said punches, respectively, and moved by the respective cams into and from operative alignment with the associated punches, with said cams being arranged to move the respective rods into operative alignment with the respective punches in different combinations corresponding to different television channels, respectively, to which said tuner is adjusted, a normally retracted common actuator movable into an operative position to engage only rods in operative alignment with the respective punches for driving the latter into the passing tape, a relay adapted when energized to move said actuator into said operative position, a timer cam driven by said synchronous motor, and a circuit for said relay including a normally open switch which is momentarily closed by said timer cam to close said circuit, with said timer cam being arranged to close said circuit so that said punches are driven into the passing tape at places in lateral alignment with said holes in the tape.

References Cited

UNITED STATES PATENTS

| | | | |
|---|---|---|---|
| 2,965,433 | 12/1960 | Alpert et al. | 346—37 |
| 3,328,802 | 6/1967 | Da Motta | 346—37 |
| 2,705,105 | 3/1955 | Paschen | 346—93 X |
| 3,051,775 | 8/1962 | Novar et al. | 346—37 X |

RICHARD B. WILKINSON, Primary Examiner

J. W. HARTARY, Assistant Examiner

U.S. Cl. X.R.

346—94